United States Patent [19]

Go et al.

[11] 3,935,140

[45] Jan. 27, 1976

[54] NOVEL AQUEOUS COATING COMPOSITIONS

[75] Inventors: Tadahiro Go; Takashi Suzuki; Masaaki Inoue, all of Kawasaki, Japan

[73] Assignee: Nippon Zeon Co. Ltd., Tokyo, Japan

[22] Filed: Sept. 23, 1974

[21] Appl. No.: 508,124

[30] Foreign Application Priority Data

Oct. 4, 1973  Japan.............................. 48-111680

[52] U.S. Cl............... 260/19 UA; 204/181; 260/21; 260/29.3; 260/29.4 UA; 260/32.6 R
[51] Int. Cl.²... C09D 3/52; C09D 3/56; C09D 5/40; C25D 13/00
[58] Field of Search........ 260/18 CI, 19 UA, 22 CB, 260/21

[56] References Cited

UNITED STATES PATENTS

| | | | |
|---|---|---|---|
| 3,258,437 | 6/1966 | Peters | 260/18 CI |
| 3,366,563 | 1/1968 | Hart | 260/18 CI |

*Primary Examiner*—Ronald W. Griffin
*Attorney, Agent, or Firm*—Frank J. Jordan

[57] ABSTRACT

Novel aqueous coating compositions comprising a water soluble or dispersible material prepared by addition reacting with at least one $\alpha,\beta$-unsaturated dicarboxylic compound a mixture of a natural drying oil and a specific liquid copolymer containing 1,3-pentadiene and 1,3-butadiene polymerization units in a specific ratio by weight to form an addition product which is then neutralized to make it soluble or dispersible in water.

11 Claims, No Drawings

NOVEL AQUEOUS COATING COMPOSITIONS

This invention relates to a novel aqueous coating composition and more particularly it relates to a novel aqueous coating composition prepared from, as the main starting material, a mixture of at least one natural drying oil with a liquid copolymer of 1,3-pentadiene and 1,3-butadiene.

Attention has recently be given to an electrophoretic coating method as a preferred coating method and attempts have been made to enable rapidly the electrophoretic coating method to be put to industrially practical use. It is known that coating materials usable for electrophoretic coating include those which are obtained by modifying with maleic anhydride a natural drying oil such as linseed oil, safflower oil, dehydrated castor oil, tung oil or soyabean oil and then neutralizing the thus-modified oil to make it soluble in water. Aqueous coating materials thus obtained have heretofore been mainly used in the electrophoretic coating field. However, aqueous coating materials containing the vehicle prepared from natural drying oils are disadvantageous in that they will be somewhat inferior in throwing power when electrophoretically coated, they will be liable to run and sag when baked after coated into films and they will give coatings which are still soft and insufficiently hard even after baked. Thus, new aqueous coating materials without such disadvantages have eagerly been sought.

Attempts have recently been made to produce a substitute for natural drying oils, and various synthetic drying oils have already been developed. Such synthetic drying oils are illustrated by liquid 1,2-polybutadiene, liquid cis-1,4-polybutadiene, liquid trans-polypentadiene and the like. These polymers may be modified to produce aqueous coating materials in the same manner as in natural drying oils. However, even the aqueous coating materials containing the vehicle prepared from these synthetic drying oils, although affording some excellent advantages, and nevertheless display a number of disadvantages, and they are thus not necessarily considered fully satisfactory.

In an attempt to eliminate the disadvantages of the aqueous coating materials prepared from natural drying oils, the present inventors have tried, by blending various synthetic and natural drying oils, to find aqueous coating materials containing a vehicle prepared from natural and synthetic drying oils, in which coating materials the disadvantages of the natural and synthetic drying oils offset each other without losing the advantages thereof. However, an aqueous coating material containing the vehicle prepared from both liquid 1,2-polybutadiene and a natural drying oil is disadvantageous since such polybutadiene and oil are liable to form a gel when subjected to an addition reaction with an $\alpha,\beta$-unsaturated dicarboxylic acid and subsequent neutralization enable their solubilization in water, and the coating material when formed as a film is inferior in such film properties as flexibility and corrosion resistance. An aqueous coating material using therein a vehicle prepared from both a natural drying oil and liquid cis-1,4-polybutadiene, exhibits excellent film properties when formed as a film but is inferior in throwing power. In addition, an aqueous coating material using therein a vehicle prepared from both liquid trans-polypentadiene and a natural drying oil has excellent throwing power but is inferior in film properties such as flexibility and impact strength when formed as films. It has thus been found that these three aqueous coating materials do not necessarily exhibit satisfactory results.

The primary object of this invention is to provide an aqueous coating composition which is excellent in throwing power, drainage and water washability and is suitable as an electrophoretic coating material.

Another object of this invention is to provide an aqueous coating composition which when formed to films and baked will not cause runs and sag thereof.

Still another object of this invention is to provide an aqueous coating composition capable of forming films thereof having improved film properties or performance.

These objects of this invention may be attained by addition reacting with at least one $\alpha,\beta$-unsaturated dicarboxylic compound a mixture containing (1) 90–50 parts by weight of a natural drying oil and (2) 10–50 parts by weight of a liquid copolymer having a number average molecular weight of from 500 to 5000 and containing 90–50% by weight of 1,3-pentadiene polymerization units and 10–50% by weight of 1,3-butadiene polymerization units, the liquid copolymer being obtained by polymerizing a corresponding monomeric mixture of 1,3-pentadiene and 1,3-butadiene in the presence of a Friedel-Crafts type catalyst, thereby to form an addition product (adduct), neutralizing the adduct to make it soluble or dispersible in water and then using the soluble or dispersible material in the preparation of an aqueous coating composition.

The natural drying oils which may be used in this invention include those having an iodine value of at least 120 (as determined by the method prescribed in JIS (Japanese Industrial Standard) K-5400) such as linseed, soyabean, safflower, tung and dehydrated castor oils and further include polymerized linseed, soyabean and safflower oils obtained by the polymerization of the corresponding natural drying oils. 1,3-pentadiene and 1,3-butadiene are hereinafter sometimes referred to as "PD" and "BD", respectively. The PD-BD copolymers which may be used in this invention are liquid copolymers containing 90–50% by weight of the units derived from 1,3-pentadiene and 10–50% by weight of the units derived from 1,3-butadiene and having a number average molecular weight of 500–5000 and an iodine value of at least 250; they may, in addition to the units derived respectively from 1,3-pentadiene and 1,3-butadiene, contain small amounts (up to 20%) by weight of the units derived from other olefins, such as butene-1, isobutylene, isoprene, 2-methylbutene-2 and cyclopentene which are copolymerizable with 1,3-pentadiene and 1,3-butadiene. Methods of preparing such copolymers are detailed in U.S. patent application Ser. No. 375,105/73, now U.S. Pat. No. 3,889,136, issued June 10, 1975. The presence of more than 90% by weight of 1,3-pentadiene units in the copolymer will result in the production of an aqueous coating material which when formed to films will be inferior in film properties such as Erichsen value and Du Pont impact strength and, to the contrary, the presence of less than 50% by weight of 1,3-pentadiene will lead to the formation of gel in the preparation of the copolymer since in this case the polymerization units of 1,3-butadiene are accordingly increased in the copolymer whereby the copolymer is made undesirable as a material for the vehicle used for the preparation of the aqueous coating composition according to this invention.

According to this invention, a mixture of 90–50 parts, preferably 80–60 parts, by weight of at least one natural drying oil and 10–50 parts, preferably 20–40 parts, by weight of the PD-BD copolymer, is provided as a material for the vehicle for the aqueous coating composition. In this case, the use of more than 90% by weight of the natural drying oil will lead to the production of an aqueous coating composition which does not fully eliminate the drawbacks of aqueous coating compositions containing a vehicle prepared from a natural drying oil, the drawbacks being illustrated by a poor throwing power found when the coating composition is electrodeposited, a run and sag caused when films formed of the composition are baked, and a low hardness of the baked films; on the other hand, the use of less than 50 parts of the natural drying oil will lead to the production of an aqueous coating composition which eliminates the aforesaid drawbacks but is not necessarily satisfactory in film properties such as Erichsen value and Du Pont impact strength.

In the practice of this invention, 100 parts by weight of a mixture containing at least one of the natural drying oils and the liquid PD-BD copolymer are reacted with 3–100 parts, preferably 3–40 parts, of at least one of the $\alpha,\beta$-unsaturated dicarboxylic compounds. When the natural drying oil is reacted with the $\alpha,\beta$-unsaturated dicarboxylic compound, gel formation sometimes results; according to this invention, on the other hand, when a mixture containing the natural drying oil and the liquid PD-BD copolymer is reacted with such a dicarboxylic compound, the components of the mixture are very easily reacted with each other without gel formation and the reaction terminates in a short time. Such features of this invention are made particularly apparent when the amounts of the $\alpha,\beta$-unsaturated dicarboxylic compound added, by the addition reaction, to 100 parts by weight of a mixture containing the natural drying oil and the PD-BD copolymer are not more than 40 parts by weight, and the features are attributed to the combined use of the natural drying oil and the PD-BD copolymer. However, the combined use of the natural drying oil and liquid cis-1,4-polybutadiene is liable to cause the formation of gel, and the combined use together with liquid 1,2-polybutadiene is also liable to cause gel formation and the mixed material is disadvantageous in that it is less reactive in the addition reaction.

The $\alpha,\beta$-unsaturated dicarboxylic compounds which may be used in this invention are represented by the following general formula

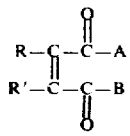

wherein R and R' are each a hydrogen atom, halogen atom or alkyl group, and A and B are each a hydroxyl group, alkoxy group or —O— together formed by A and B with the proviso that A and B can not each be an alkoxy group at the same time; and the suitable ones include those usually having not more than 8 carbon atoms, such as maleic acid, maleic anhydride, chloromaleic anhydride, citraconic anhydride, 1,2-diethylmaleic anhydride, monomethyl maleate and monoethyl maleate, among which maleic anhydride is the most recommendable from the view-point of economy and quality. The mixture of the natural drying oil and the liquid PD-BD copolymer is reacted with the $\alpha,\beta$-unsaturated dicarboxylic compound at 50°–300°C, preferably 150°–250°C, for 5 minutes - 10 hours, preferably 1–5 hours. If necessary, in this case, there may be used anti-gelling agents such as tertiary-amylhydroquinone, hydroquinone, diphenylamine, 2,6-di-tertiary-butyl-4-methylphenol and copper compounds, in amounts of 0.01–5% by weight of said mixture, and there may also be used as reaction accelerators, peroxides such as di-tertiary-butyl peroxide, benzoyl peroxide and lauroyl peroxide. In addition, solvents such as benzene, toluene, xylene and tetralin, which are inert to the reaction, may further be used in order to decrease the viscosity of the mixed reactants (the PD-BD copolymer, natural drying oil and unsaturated dicarboxylic compound) thereby allowing the reaction to proceed smoothly.

The reaction product, obtained by the reaction between the $\alpha,\beta$-unsaturated dicarboxylic compound and the mixture of the natural drying oil and liquid PD-BD copolymer, has an acid value of usually not higher than 150 and it can be neutralized by an inorganic alkali, alkali salt or amine in amounts of 0.5–1.5 equivalents per COOH equivalent as determined from the acid value thereof to make it soluble or dispersible in water. The inorganic alkalies include ammonia water, sodium hydroxide and potassium hydroxide; the alkali salts include ammonium carbonate, sodium carbonate and potassium carbonate; and the amines include ethanolamine, diethanolamine, triethanolamine, dimethylaminoethanol, trimethylamine, ethylamine, diethylamine, triethylamine and N-methylmorpholine.

The reaction product thus made water soluble or dispersible is treated so as to prepare a 5–60 wt.% aqueous solution or dispersion thereof for use as a vehicle for the aqueous coating composition, and it is especially preferred that it be prepared in the form of a 5–25 wt.% solution or dispersion thereof for use in the production of an aqueous coating composition to be used as an electrophoretic coating material and it is also preferred that the pH of the liquid (solution or dispersion) be adjusted to a range of from 6.5 to 9.0. As desired in this case, the liquid of the reaction product may be combined or admixed with normally used fillers, pigments and other additives and may further be combined or admixed with water soluble or dispersible resins compatible with said reaction product in order to form thicker films thereof, improve it in film properties such as hardness and Erichsen value and eliminate some water spots which are otherwise often found on the films. Suitable resins include phenol resins such as the condensate of formaldehyde and a phenolic compound and such condensate esterified with a low molecular weight alcohol and further include melamine resins such as the condensate of formaldehyde and melamine and such condensate esterified with a low molecular weight alcohol, and the amount of the resins used is not more than 50 parts, preferably 5–50 parts, by weight per 100 parts by weight of water soluble or dispersible product prepared from the mixture of the natural drying oil and the PD-BD copolymer.

The thus-obtained aqueous coating compositions of this invention can be used in the form of a bath wherein an article to be coated is provided as the anode and an electric current is applied, thereby forming a uniform coating or film on the article by electrodeposition. In such coating operations the coating compositions of this invention will exhibit quite excellent electrodeposition properties expressed in terms of washability, drainage and throwing power, will cause no runs and sags when baking films are formed thereof and will provide films having an excellent hardness. The use of the aqueous coating compositions of this invention as substitutes for conventional ones prepared from the natural drying oil only as material for the vehicle, will eliminate all properties which have been considered to be the drawbacks of the conventional aqueous coating compositions and will lead to the formation of coatings or films having excellent film properties such as gloss, adhesion, Erichsen value and impact strength. Moreover, since the aqueous coating compositions of this invention have a high dielectric breakage voltage relative to the conventional ones, they permit voltages used for the electrodeposition thereof to be widely varied thereby making it possible to effect the electrodeposition under suitable conditions, this being operationally very advantageous.

This invention will be better understood by the following examples wherein parts and percentages are by weight as in the following Reference examples unless otherwise specified.

Reference example

To a 130-ml separable flask provided with a pipe for nitrogen blown thereinto and a reflux condenser were added 100 parts of each of Samples A through I and then 10 parts of xylene to form a uniform solution. The uniform solution so formed was combined or admixed with 0.03 parts of copper naphthenate as an anti-gelling agent, and the mixture was heated to 130°C in a nitrogen atmosphere, thereafter combined or admixed with 20 parts of maleic anhydride and then heated to 190°–220°C for about three hours, after which a spot test using dimethylaniline was carried out to detect whether or not the unreacted maleic anhydride was present in the reaction product obtained. A portion of the reaction product thus obtained was tested for acid value in accordance with JIS (Japanese Industrial Standard) K-5400 and another portion was tested for solubility using Butylcellosolve, toluene and carbon tetrachloride as solvents, thereby confirming whether or not gel formation took place. The results are shown in Table 1.

shows that the reaction product so obtained did not contain any gel. However, the Table also shows that the use of the polymerized linseed oil only (Sample A) resulted in the formation of gel, and that even the use of the mixture (Sample I) of the polymerized linseed oil and liquid 1,2-polybutadiene could not avoid such gel formation.

EXAMPLE 1

Eighty-five parts of each of Samples (B through H) were combined or admixed with 15 parts of Butylcellosolve and then with triethylamine in the amount of about 0.8 equivalent to form a mixture which was then throughly mixed. The mixtures so formed were combined or admixed respectively with deionized water thereby to obtain aqueous coating compositions (Nos. 1 to 7 in Table 2) containing the resinous solids in adjusted amounts of 10–11% by weight. The aqueous compositions so obtained were, respectively, allowed to stand overnight, freed from water-insoluble gel by filtration with a 80-mesh wire net if necessary, tested for their pH and used as the electrodepositing baths for making tests for electrodeposition under the following conditions:

| | |
|---|---|
| Voltage: | 100 V |
| Time of application of current: | 2 min. |
| Distance between electrodes: | 7 cm |
| Anode plate: (Test piece) | Phosphated iron plate having a size of 0.5 mm × 50 mm × 100 mm |
| Agitation of bath: | Agitation carried out |
| Temperature of bath: | 25°C |

After the termination of the current application, the test pieces coated by electrodeposition were withdrawn from the bath and subjected to a strong water stream ejected the coated surface thereof to wash off the liquid carried with the coated pieces from the bath. After the washing with water, the coated pieces were air-dried in a chamber at 25°C under a relative humidity of 75% for three hours, during which they were tested for their drainage. After the air-drying, they were placed in a heated air circulating oven at 180°C for 30 minutes to cure the coating or film formed thereon. In this manner the aqueous coating compositions were tested for properties required in the electrodeposition process, the state of the film formed on each of the coated pieces was found and the films were also tested for their film properties. The results are shown in Table 2.

The Table shows that the aqueous coating composition prepared from linseed oil is somewhat inferior in Table 1

| Sample | | A | B | C | D | E | F | G | H | I |
|---|---|---|---|---|---|---|---|---|---|---|
| Polymerized linseed oil (No. 3) | (Parts) | 100 | — | — | 30 | 60 | 80 | 70 | 70 | 70 |
| Linseed oil | (″) | — | 100 | — | — | — | — | — | — | — |
| PD-BD copolymer*¹ | (″) | — | — | 100 | 70 | 40 | 20 | — | — | — |
| Liquid polypentadiene*² | (″) | — | — | — | — | — | — | 30 | — | — |
| Liquid cis-polybutadiene*³ | (″) | — | — | — | — | — | — | — | 30 | — |
| Liquid 1,2-polybutadiene*⁴ | (″) | — | — | — | — | — | — | — | — | 30 |
| Spot test | | Neg (Negative) | Neg | Neg | Neg | Neg | Neg | Neg | Neg | Pos (Positive) |
| Acid value (KOH mg/g) | | — | 92 | 104 | 110 | 107 | 108 | 105 | 96 | — |
| Gel formation, Butylcellosolve | | Gel formed | None | None | None | None | None | None | None | Gel formed |
| Toluene | | ″ | ″ | ″ | ″ | ″ | ″ | ″ | ″ | ″ |
| Carbon tetrachloride | | ″ | ″ | ″ | ″ | ″ | ″ | ″ | ″ | ″ |

*¹Prepared in the presence of boron trifluoride.diethyl etherate catalyst, and containing 80% of PD polymerization units and 20% of BD polymerization units and having a number average molecular weight of 1100 and iodine value of 280.
*²Prepared in the presence of boron trifluoride.diethyl etherate catalyst and having a number average molecular weight of 1100 and iodine value of 280.
*³Poly oil Hüls 110. Number average molecular weight of 1400 (Produced by Hüls Co.).
*⁴Nisso-PB B-2000. Number average molecular weight of 2000 (Produced by Nippon Soda Co.).

Each of the mixtures (Samples D, E and F) of the natural drying oil and the PD-BD copolymer was very rapidly reacted with the maleic anhydride; and Table 1 throwing power among the electrodeposition properties and creates the runs and sags on the surface of the cis-polybutadiene are used together with the polymerized linseed oil, respectively.

Table 2

|  | Comparative examples | | | Examples of this invention | | Comparative examples | |
|---|---|---|---|---|---|---|---|
| Aqueous coating composition | 1 | 2 | 3 | 4 | 5 | 6 | 7 |
| Sample | B | C | D | E | F | G | H |
| Resinous solids concentration (%) | 10.0 | 11.1 | 10.0 | 10.2 | 10.6 | 10.2 | 10.1 |
| pH | 7.9 | 7.5 | 7.5 | 7.7 | 7.7 | 7.7 | 7.8 |
| Electrodeposition properties | | | | | | | |
| Washability | Satisfactory | Satisfactory | Satisfactory | Satisfactory | Satisfactory | Satisfactory | Satisfactory |
| Drainage | Ditto | Ditto | Ditto | Ditto | Ditto | Ditto | Ditto |
| Throwing power | 80 | 100 | 100 | 100 | 100 | 100 | 80 |
| Dielectric breakage voltage (V) | 180 | >240 | >240 | >240 | >240 | 180 | 180 |
| Electrodeposited film properties | | | | | | | |
| State of film | Flow and hanging | Uniform | Uniform | Uniform | Uniform | Uniform | Uniform |
| Thickness, film ($\mu$) | 18 | 6 | 6 | 14 | 16 | 12 | 25 |
| Specular reflection 60° (%) | 82 | 89 | 84 | 98 | 100 | 84 | 82 |
| Cross-cut value | 100 | 100 | 100 | 100 | 100 | 100 | 100 |
| Pencil hardness | B | 9H | 3H | H | H | HB | F |
| Erichsen (mm) | 8 | 5 | 6 | 8 | 8 | 4 | 8 |
| Du Pont impact strength (½" × g × cm) | 1000×50 | 500×30 | 500×50 | 1000×50 | 1000×50 | 500×50 | 1000×50 |
| Water resistance*[1] | O | O | O | O | O | O | O |
| Corrosion resistance*[2] (Saline spray) | O | O | O | O | O | O | O |
| Solvent resistance*[3] | O | O | O | O | O | O | O |

*[1] JIS K-5400 Immersed in water at 20°C for 3 days.
*[2] JIS Z-2371 Sprayed with a 5% aqueous solution of sodium chloride at 35°C for 50 hours.
*[3] JIS K-5400 Immersed in a mixture of petroleum benzine and toluene in the ratio by volume of 9:1, at 20°C for 48 hours.
O: Satisfactory films formed thereof, and that the films so formed have a low hardness and the like. The aqueous coating composition 6 in which the liquid polypentadiene (Sample G) is used, is improved in throwing power but, when formed as films, is inferior in Erichsen, impact strength and the like; and the coating composition 7 using the liquid cis-polybutadiene (Sample H), exhibits excellent film properties when formed as films but is inferior in throwing power.

On the other hand, the aqueous coating compositions 4 and 5 of this invention are excellent in both electrodeposition properties and film properties when formed as films, and the films so formed are excellent especially in specular reflection as compared with those obtained by the aqueous coating compositions 1 and 2 wherein either the linseed oil or the PD-BD copolymer is used. These compositions 4 and 5 of this invention have a remarkably high dielectric breakage voltage as compared with the conventional coating compositions 6 and 7 wherein the liquid polypentadiene and liquid

EXAMPLE 2

The aqueous coating compositions 1 and 5 through 7 prepared in Example 1 were each used as an electrodepositing bath while setting the electrodepositing voltage at the levels of 60, 120, 160 and 200 volts to find the electrodepositing properties and film properties after formed as films. The other conditions used in this Example were the same as those used in Example 1. The results are indicated in Table 3.

From Table 3 it is seen that the aqueous coating compositions allow the electrodeposition to be effected even if the voltage is varied over a wide range and they exhibit excellent electrodeposition properties regardless of the variation in voltage and also exhibit excellent film properties when formed as films, and that the conventional aqueous coating compositions of Comparative examples do not allow electrodeposition to be effected at a voltage of 200 volts.

Table 3

|  | Comparative examples | | | | Examples of this invention | | | | Comparative examples | | | | | | | |
|---|---|---|---|---|---|---|---|---|---|---|---|---|---|---|---|---|
| Aqueous coating composition | 1 | 1 | 1 | 1 | 5 | 5 | 5 | 5 | 6 | 6 | 6 | 6 | 7 | 7 | 7 | 7 |
| Sample | B | B | B | B | F | F | F | F | G | G | G | G | H | H | H | H |
| Resinous solids concentration (%) | 10.0 | 10.0 | 10.0 | 10.0 | 10.6 | 10.6 | 10.6 | 10.6 | 10.2 | 10.2 | 10.2 | 10.2 | 10.1 | 10.1 | 10.1 | 10.1 |
| pH | 7.9 | 7.9 | 7.9 | 7.9 | 7.7 | 7.7 | 7.7 | 7.7 | 7.7 | 7.7 | 7.7 | 7.7 | 7.8 | 7.8 | 7.8 | 7.8 |
| Voltage (V) | 60 | 120 | 160 | 200 | 60 | 120 | 160 | 200 | 60 | 120 | 160 | 200 | 60 | 120 | 160 | 200 |
| Electrodeposition properties | | | | | | | | | | | | | | | | |
| Washability | Sa | Sa | Sa | — | Sa | Sa | Sa | Sa | Sa | Sa | Sa | — | Sa | Sa | Sa | — |
| Drainage | Sa | Sa | Sa | — | Sa | Sa | Sa | Sa | Sa | Sa | Sa | — | Sa | Sa | Sa | — |
| Throwing power (%) | 80 | 80 | 80 | — | 100 | 100 | 100 | 100 | 100 | 100 | 100 | — | 80 | 80 | 80 | — |
| Electrodeposited film properties | | | | | | | | | | | | | | | | |
| Thickness of film ($\mu$) | 14 | 18 | 20 | — | 9 | 14 | 14 | 24 | 10 | 12 | 14 | — | 22 | 26 | 24 | — |
| Specular reflection 60° (%) | 80 | 82 | 84 | — | 96 | 100 | 100 | 100 | 98 | 98 | 100 | — | 78 | 82 | 84 | — |
| Cross-cut value | 100 | 100 | 100 | — | 100 | 100 | 100 | 100 | 100 | 100 | 100 | — | 100 | 100 | 100 | — |

Table 3-continued

|  | Comparative examples | | | | Examples of this invention | | | | Comparative examples | | | | | | |
|---|---|---|---|---|---|---|---|---|---|---|---|---|---|---|---|
| Erichsen (mm) | 8 | 8 | 8 | — | 8 | 8 | 8 | 8 | 4 | 6 | 6 | — | 8 | 8 | 8 | — |
| Du Pont impact strength (½" × g × cm) | 1000 × 50 | 1000 × 50 | 1000 × 50 | — | 1000 × 50 | 1000 × 50 | 1000 × 50 | 1000 × 50 | 500 × 50 | 500 × 50 | 500 × 50 | — | 1000 × 50 | 1000 × 50 | 1000 × 50 | — |

Note: "Sa" stands for "Satisfactory".

EXAMPLE 3

The water soluble phenol resin and/or water soluble melamine resin was added to the aqueous coating composition 5 which was prepared using Sample F produced in Example 1 in order to prepare each of the aqueous coating compositions (8 to 10), the amounts of the water soluble phenol or melamine resins used being determined per 100 parts of the resinous solids contained in the coating composition 5 as shown in Table 4.

The procedure of Example 1 was followed, except that the coating composition was replaced by each of the aforesaid ones (8-10) and the electrodeposition was carried out at a voltage of 120 volts, in order to make the electrodeposition test on each of the compositions (8-10). The results are indicated in Table 4.

Table 4

| Aqueous coating composition | 5 | 8 | 9 | 10 |
|---|---|---|---|---|
| Phenol resin*¹ (Parts) | — | 14 | — | 14 |
| Melamine resin*² (Parts) | — | — | 20 | 20 |
| Resinous solids concentration (%) | 10.6 | 10.0 | 10.0 | 10.0 |
| pH | 7.7 | 7.6 | 7.7 | 7.5 |
| Electrodeposited film properties | | | | |
| Water spot | Some | Almost none | Almost none | None |
| Thickness of film | 14 | 16 | 20 | 26 |
| Specular reflection 60° (%) | 100 | 100 | 100 | 100 |
| Cross-cut value | 100 | 100 | 100 | 100 |
| Pencil hardness | H | 2H | 2H | H |
| Erichsen (mm) | 8 | 8 | 10 | 10 |
| Du Pont impact strength (½" × g × cm) | 1000 × 50 | 1000 × 50 | 1000 × 50 | 1000 × 50 |

*¹WP-71 (produced by Gunei Chemical Co.) liquid methylol phenol resin.
*²Nicalac MX-40 (produced by Sanwa Chemical Co.) liquid melamine resin for electrodeposition.

From this Table it can be seen that the incorporation of the aqueous coating compositions of this invention with the phenol resin or melamine resin can eliminate the water spots which may otherwise be found to form on the surface of films formed of the original composition and can provide films which are larger in thickness and are improved in film properties such as hardness and Erichsen.

EXAMPLE 4

Following the procedure of Example 1, but using as the electrodepositing bath the aqueous coating composition 9 prepared in Example 3 and setting the voltage at 60, 100, 140 and 180 volts, the films so obtained were tested for their film properties. The results are shown in Table 5.

Table 5

| Voltage | 60 | 100 | 140 | 180 |
|---|---|---|---|---|
| Film properties | | | | |
| Thickness of film | 14 | 16 | 30 | 58 |

Table 5-continued

| Voltage | 60 | 100 | 140 | 180 |
|---|---|---|---|---|
| Specular reflection 60° (%) | 100 | 100 | 100 | 100 |
| Cross-cut value | 100 | 100 | 100 | 100 |
| Pencil hardness | 2H | 4H | H | HB |
| Erichsen (mm) | 10 | 10 | 10 | 10 |
| Du Pont impact strength (½" × g × cm) | 1000 × 50 | 1000 × 50 | 1000 × 50 | 1000 × 50 |

From the results shown in Table 5 it is seen that the addition of the melamine resin to the aqueous coating compositions of this invention and the selective variation in voltage will permit films from the modified coating compositions to be formed in any thickness varying over a wide range.

What is claimed is:

1. An aqueous coating composition comprising a water soluble or dispersible material prepared by addition reacting a mixture containing (1) 90-50 parts by weight of a natural drying oil and (2) 10-50 parts by weight of a liquid copolymer having a number average molecular weight of from 500 to 5000 and containing 90-50% by weight of 1,3-pentadiene polymerization units and 10-50% by weight of 1,3-butadiene polymerization units, the liquid copolymer being obtained by polymerizing a corresponding monomeric mixture of 1,3-pentadiene and 1,3-butadiene in the presence of a Friedel-Crafts type catalyst, with at least one α,β-unsaturated dicarboxylic compound represented by the following general formula

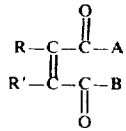

wherein R and R' are each a hydrogen atom, halogen atom or alkyl group, and A and B are each a hydroxyl group, alkoxy group or —O— together formed by A and B with the proviso that A and B do not take an alkoxy group at the same time, thereby to form an addition product which is then neutralized to make it soluble or dispersible in water.

2. An aqueous coating composition according to claim 1, wherein the mixture contains (1) 80-60 parts by weight of the natural drying oil and (2) 20-40 parts by weight of the liquid copolymer.

3. An aqueous coating composition according to claim 1, further comprising a member selected from the group consisting of water soluble phenol and melamine resins, in amounts of 5-50 parts by weight per 100 parts by weight of said water soluble or dispersible material.

4. An aqueous coating composition according to claim 1, wherein the natural drying oil is selected from the group consisting of linseed oil, soyabean oil, safflower oil, tung oil, dehydrated castor oil and these in polymerized form.

5. An aqueous coating composition according to claim 1, wherein the α,β-unsaturated dicarboxylic compound represented by said general formula is one having not more then 8 carbon atoms.

6. An aqueous coating composition according to claim 1, wherein the α,β-unsaturated dicarboxylic compound is used in amounts of 3–100 parts by weight per 100 parts by weight of the mixture containing the natural drying oil (1) and the liquid copolymer (2).

7. An aqueous coating composition according to claim 1, wherein the copolymer (2) includes up to 20% by weight of the polymerization units of at least one other olefin.

8. An aqueous coating composition according to claim 7, wherein the other olefin is a member selected from the group consisting of butene-1, isobutylene, isoprene, 2-methylbutene-2 and cyclopentene.

9. An aqueous coating composition comprising a water soluble or dispersible material prepared by addition reacting a mixture containing (1) 90–50 parts by weight of a natural drying oil and (2) 10–50 parts by weight of a liquid copolymer having a number average molecular weight of from 500 to 5000 and containing 90–50% by weight of 1,3-pentadiene polymerization units and 10–50% by weight of 1,3-butadiene polymerization units, the liquid copolymer being obtained by polymerizing a corresponding monomeric mixture of 1,3-pentadiene and 1,3-butadiene in the presence of a Friedel-Crafts type catalyst, with at least one α,β-unsaturated dicarboxylic compound with the latter being a member selected from the group consisting of maleic acid, maleic anhydride, chloromaleic anhydride, citraconic anhydride, 1,2-diethylmaleic anhydride, monomethyl maleate and monoethyl maleate, thereby to form an addition product which is then neutralized to make it soluble or dispersible in water.

10. A process for preparing a water soluble or dispersible material useful for an aqueous coating composition comprising addition reacting a mixture containing (1) 90–50 parts by weight of a natural drying oil and (2) 10–50 parts by weight of a liquid copolymer having a number average molecular weight of from 500 to 5000 and containing 90–50% by weight of 1,3-pentadiene polymerization units and 10–50% by weight of 1,3-butadiene polymerization units, the liquid copolymer being obtained by the polymerization of a corresponding monomeric mixture of 1,3-pentadiene and 1,3-butadiene in the presence of a Friedel-Crafts type catalyst, with at least one α,β-unsaturated dicarboxylic compound represented by the following general formula

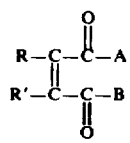

wherein R and R' are each a hydrogen atom, halogen atom or alkyl group, and A and B are each a hydroxyl group, alkoxy group or —O— together formed by A and B with the proviso that A and B do not take an alkoxy group at the same time, thereby to form an adduct and then neutralizing the thus formed adduct thereby to obtain a water soluble or dispersible material.

11. A process according to claim 10, wherein the water soluble or dispersible material is incorporated with a member selected from the group consisting of the water soluble or dispersible phenol resins and melamine resins, in amounts of 5–50 parts by weight per 100 parts by weight of said water soluble or dispersible material.

* * * * *